March 23, 1954     N. KAPLAN     2,672,648
FISH SCALING CYLINDER CONSTRUCTION
Filed June 30, 1950

Nathan Kaplan
INVENTOR
BY *CA Snow & Co.*
ATTORNEYS.

Patented Mar. 23, 1954

2,672,648

UNITED STATES PATENT OFFICE 2,672,648

FISH SCALING CYLINDER CONSTRUCTION

Nathan Kaplan, Atlanta, Ga.

Application June 30, 1950, Serial No. 171,517

1 Claim. (Cl. 17—5)

This invention relates to a fish scaling cylinder construction, the primary object of the invention being to provide fish scaling cylinders for use on fish scaling machines in lieu of the usual rotary brushes employed in removing fish scales.

An important object of the invention is to provide fish scaling cylinders wherein the scraping teeth are so constructed and arranged that they will remove the scales from the fish without damage to the fish to impair the commercial value of the fish.

Still another object of the invention is to arrange the teeth in such a way that radial evenly spaced grooves are provided between the adjacent rows of teeth, the grooves providing passageways to permit the scales removed from the fish, to pass from the cylinder, without clogging the teeth and without impairing the scaling operation of the teeth.

With the foregoing and other objects in view which will appear as the description proceeds, the invention consists of certain novel details of construction and combinations of parts hereinafter more fully described and pointed out in the claim, it being understood that changes may be made in the construction and arrangement of parts without departing from the spirit of the invention as claimed.

Referring to the drawing.

Figure 1:
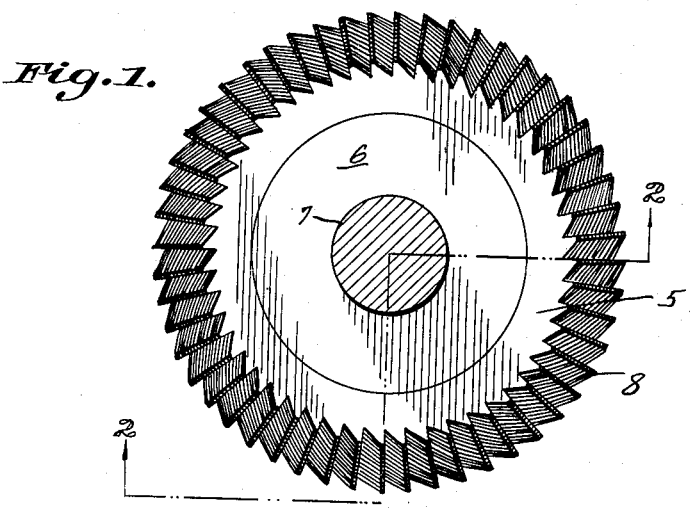
Figure 1 is an end elevational view of a fish scaling cylinder, constructed in accordance with the invention.
Figure 2:
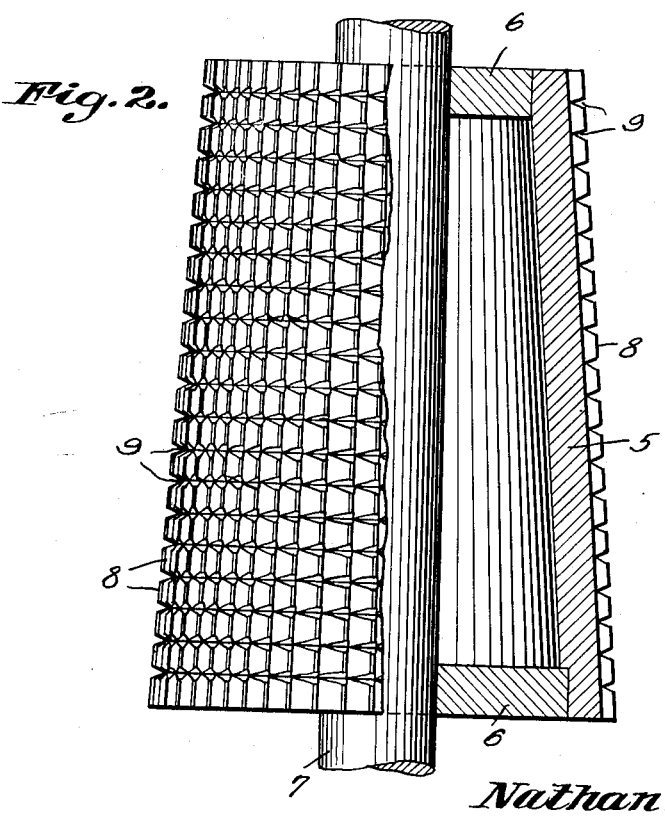
Fig. 2 is a side elevational view, partly in section taken on line 2—2 of Fig. 1.

Referring to the drawing in detail, the scaling cylinder is indicated generally by the reference character 5 and as shown, is of truncated cone shape of hollow construction, there being provided bearings 6 secured within the ends thereof, the bearings 6 having openings for the reception of the shaft 7, to which the body portion is secured to rotate therewith.

As clearly shown by Fig. 1 of the drawing, the teeth, which are wide or of blade construction, indicated at 8, are arranged in rows, disposed throughout the entire circumference of the body portion, the teeth 8 being inclined forwardly or in the direction of rotation of the body portion which rotary movement is opposite to the movement of the fish passing through the machine to be engaged by the teeth, so that the teeth will contact the scales of the fish to remove the scales.

Annular grooves 9 separate the adjacent rows of teeth 8, and provide passageways or channels through which the scales and other foreign matter which may be removed by the teeth may pass from the cylinders, eliminating any possibility of the scales and foreign matter clogging the teeth to impair the operation of the cylinder.

It will of course be understood that these truncated cones are arranged in pairs, so that the fish being scaled will be directed between adjacent rotating cylinders in order to carry out the scaling operation. The rotation of the cylinders and movement of the teeth over the scales of the fish will of course remove the scales which will be carried off in the usual way.

Having thus described the invention, what is claimed is:

A fish scaling cylinder, comprising a truncated cone-shaped hollow body, bearing members disposed in the ends of said hollow body closing the ends of the body, substantially wide inclined blades extending from the periphery of the body throughout the entire area of the outer surface of the body, the outer surface of the body having annular grooves providing passageways around the body through which fish scales are delivered from the blades, and a shaft extending through the bearings with which the scaling cylinder rotates.

NATHAN KAPLAN.

References Cited in the file of this patent

UNITED STATES PATENTS

| Number | Name | Date |
|---|---|---|
| 1,078,558 | Schwartz | Nov. 11, 1913 |
| 1,235,085 | Weinberg | July 31, 1917 |
| 2,128,607 | Godfrey | Aug. 30, 1938 |
| 2,154,187 | Scoville | Apr. 11, 1939 |
| 2,376,603 | Kirkland | May 22, 1945 |
| 2,481,182 | Waters | Sept. 6, 1949 |

FOREIGN PATENTS

| Number | Country | Date |
|---|---|---|
| 470,211 | Germany | Jan. 8, 1929 |